United States Patent [19]

Belyshev et al.

[11] 4,099,549

[45] Jul. 11, 1978

[54] DEVICE FOR APPLICATION OF PASTE TO INTERNAL SURFACE OF CYLINDRICAL ELECTRODE OF PRIMARY CELL

[76] Inventors: Leonid Lavrentievich Belyshev, ulitsa Akademika Komarova, 19a, kv. 52, Moscow; Veniamin Ivanovich Gorokhov, poselok Pravdinsky, 2 Novoproletarskaya ulitsa, 1, kv. 4, Moskovskaya oblast; Albert Vladimirovich Chuvpilo, ulitsa Novo-Alexeevskaya, 48, korpus 37, kv. 281, Moscow, all of U.S.S.R.

[21] Appl. No.: 808,978

[22] Filed: Jun. 23, 1977

[51] Int. Cl.² .............................................. B65B 3/04
[52] U.S. Cl. ..................................... 141/32; 141/392
[58] Field of Search ...................... 141/1.1, 32, 33, 83, 141/100, 131, 163, 168, 177, 280, 283, 284, 324, 325, 392; 29/623 S; 118/405, 42, 404, 410, 411, 413, 415

[56] References Cited

U.S. PATENT DOCUMENTS 3,175,591  3/1965  Manas ................................. 141/392

*Primary Examiner*—Houston S. Bell

*Attorney, Agent, or Firm*—Lackenbach, Lilling & Siegel

[57] ABSTRACT

The device for application of paste to the internal surface of a cylindrical electrode comprises a cylindrical body, a hydraulic cylinder with a rod, a spring, a cylindrical arbor with a central channel and a mandrel with an internal channel for compressed air. The mandrel is installed in the central channel of said arbor with a provision for being reciprocated by the hydraulic cylinder rod and has its lower part in the form of a truncated cone whose larger base serves as the face of the mandrel and whose generatrix is inclined to the larger base at an angle varying from 10° to 60° and where the ratio of the diameter of the larger base to the diameter of the external surface of the arbor varies from 0.77 to 0.98. Installed in the upper part of the body is the hydraulic cylinder with the rod while in the lower part of the body, separated from the upper part by a partition with a hole, the upper part of the arbor is fixed rigidly. Said arbor accommodates in its upper part a first space for the spring, a second space for compressed air, a third space for the paste and a fourth space for the paste, in the lower part of the arbor, communicating with the third space through at least one channel.

1 Claim, 5 Drawing Figures

DEVICE FOR APPLICATION OF PASTE TO INTERNAL SURFACE OF CYLINDRICAL ELECTRODE OF PRIMARY CELL

The present invention relates to equipment for manufacturing primary cells and more particularly it relates to a device for the application of a paste, i.e., thickened electrolyte, to the internal surface of the cylindrical electrode of a primary cell which can be utilized for assembling primary cells on mechanized production lines.

The prior art device for applying paste, i.e., thickened electrolyte, to the internal surface of the cylindrical jars of primary cells with alkalinous electrolyte comprises an arbor with a central channel which communicates with the atmosphere through two side channels located in the upper part of said arbor. In the lower part of the arbor the central channel ends in a tapered hole in which is secured by a screw a movable valve whose shape follows that of the tapered hole and which forms, together with the surface of the channel, a circular gap in one extreme position or covers the central channel completely in the other extreme position. The side surface of the arbor, at the level of the upper edge of the applied layer of thickened electrolyte, has channels for letting out the surplus thickened electrolyte at the moment of making the layer in the cell jar. For aligning the arbor relative to the internal surface of the cell jar and for limiting the height of the applied layer, there is a guide bushing whose inside diameter is equal to that of the arbor and whose outside diameter is equal to the inside diameter of the cell jar (see, for example, Pat. No. 436407 Cl.H01M 21/06, Switzerland).

This device allows the layer of paste (thickened electrolyte) to be applied to the internal surface of the cylindrical electrode of the primary cell (cell jar) by preliminary batching of a preset amount (by volume or weight) of paste (thickened electrolyte) into the inner space of the cell jar, by installing a guide bushing on the upper part of the cell jar, moving the arbor from the guide bushing into the cell jar and spreading the thickened electrolyte over the internal surface of the cell jar.

At the beginning of the arbor movement the valve is open, thus placing the space under the arbor in communication with the atmosphere and preventing the pressure from rising inside the cell jar. At the moment of contact between the arbor and the paste the valve closes the central hole. During further movement of the arbor and paste fills the space between the wall of the cell jar and the external surface of the arbour.

Movement of the arbor ceases after making the preset layer of thickened electrolyte between the arbor face and the bottom of the cell jar, the surplus paste being forced out through side channels. Then the arbor and the guide bushing are withdrawn from the cell jar.

This prior art device is adapted for application of comparatively thick layers of thickened electrolyte.

If it is required to apply thin layers to the primary cells with high electrical characteristics, this may lead to a considerably high percentage of waste due to a low quality of the layer.

Besides, both the arbor and the valve should be made from a material featuring a minimum adhesion, otherwise the paste may stick to the arbor and the applied layer may be disturbed when the arbor is being withdrawn from the cell jar.

For the same reason the prior art device cannot be used for applying the thickened electrolyte with a high stickiness.

The prior art device has but a low productivity because of the necessity for preliminary batching of paste into the cell jar and for installing the guide bushing.

Known in the prior art is another device for application of paste to the internal surface of a cylindrical electrode of a primary cell.

This device comprises a cylindrical arbor installed with a provision for reciprocating motion, said arbor having a central channel which accommodates a cylindrical mandrel.

The lower end of the central channel in the arbor has a cylindrical space for the paste.

The mandrel has an internal channel for delivering air and a central space for the paste.

The central space of the mandrel accommodates a piston with a rod while the upper end of the arbor has a stop for the piston rod.

The upper part of the mandrel also has a hole for the admission of paste into its central space while the lower part has channels for the discharge of paste into the cylindrical space of the arbor.

Below the paste discharge channels the mandrel has the shape of a truncated cone whose larger base serves as the mandrel face and whose generatrix is set at an angle of from 10° to 60° to the larger base.

The piston with the rod and the hole for the admission of paste constitute a device for batching the paste to be applied to the internal surface of the cylindrical electrode.

This prior art device allows the paste to be applied irrespective of its stickiness to the internal surface of the cylindrical electrode at a certain angle to said surface, said angle being ensured by the conical gap between the lower part of the mandrel and the face surface of the arbor which has a tapered slant.

The thickness of the applied layer of paste is governed by the dimensions of said conical gap and can be controlled by the relative displacement of the arbor and mandrel, while the height of the applied layer depends on the volume of the central space of the mandrel.

In spite of the fact that the prior art device is suitable for applying layers of paste of any desired thickness, if it is required to change the total quantity of the applied paste, it calls for changing the volume of the central space of the mandrel which involves replacement of the latter end, and consequently, a considerable waste of time.

Besides, inasmuch as the device has no provision for closing the conical gap between the face portion of the arbor and the lower part of the mandrel on completion of the paste application, a certain quantity of said paste may get on the portion of the internal surface of the electrode which constitutes the walls of the air chamber of the primary cell being formed.

In accordance with the above-stated facts an object of the present invention resides in providing a highly-efficient device for application of paste to the internal surface of the cylindrical electrode of a primary cell which excludes waste of time and ensures efficient utilization of the device under the conditions of flow line production.

Another object of the present invention resides in providing a device which ensures a high quality of paste application, namely a uniform layer of a preset thickness, a sound contact between said layer and the internal surface of the cylindrical electrode, and application of the paste layer to a strictly defined portion of the internal surface of the electrode.

Still another object of the invention resides in providing a device for application of paste to the internal surface of the cylindrical electrode of a primary cell which would ensure reliable operation during production line manufacture of cells and, in particular, steady and synchronous operation at high speeds of the arbor at the moment of paste application.

A further object of the present invention resides in providing a device whose dimensions and shape would make it suitable for use under the conditions of flow line production.

A no less important object of the invention resides in providing a device for application of paste to the internal surface of the cylindrical electrode which would maintain a high pressure of the paste (e.g., up to 100 kgf/cm$^2$ and higher) fed continuously from the batching device which would rule out the wastage of time caused by the inertia and compressibility of the paste at the stage of its application to the electrode.

Finally, one of the objects of the present invention resides in providing a device which is simple in design.

In accordance with these and other objects, the substance of the present invention is a device for application of paste to the internal surface of the cylindrical electrode of a primary cell which comprises a cylindrical arbor with a central channel installed with a provision for reciprocating motion, and a mandrel located in the central channel of the arbor which has a space at the end for the paste to be applied to the internal surface of the cylindrical electrode, said mandrel having a channel for compressed air and the lower end of the mandrel having the shape of a truncated cone whose larger base serves as the face of the mandrel and whose generatrix is inclined to the larger base at an angle ranging from 10° to 60°. According to the invention, the device also comprises a hydraulic cylinder, a spring and a cylindrical body installed with a provision for reciprocating motion and divided by a partition with a central hole into an upper part, accommodating the hydraulic cylinder with a rod which has at the end a limiting nut whose diameter is larger than the diameter of the hole in the partition, and a lower part, wherein there is a rigidly fixed upper part of the arbor. The central channel of the arbor in its upper part has three spaces consecutively arranged, the first of which accommodates a spring installed on the mandrel, said spring having its lower end bearing against the bottom of said space while its upper end bears against the adjusting nut of the mandrel, which is installed on its upper end and has a diameter smaller than that of the first space, the second space communicating with a source of compressed air through a side hole of the mandrel and being located in the zone of a mandrel side hole which places the compressed air channel of said mandrel in communication with said second space, and the next or, third space communicating through a second side hole of the arbor with the pressure source of paste supply and through at least one paste channel in the arbor, with the above-mentioned paste space. The mandrel is installed with a provision for being reciprocated by the hydraulic cylinder which, together with the spring, constitutes a paste batching device. The ratio of the diameter of the larger base of the lower part of the mandrel to the diameter of the external surface of the arbor ranges from 0.77 to 0.98.

The device, according to the invention, for application of paste to the internal surface of the cylindrical electrode of a primary cell can be used effectively in flow line production, ensuring a high productivity and operational reliability; in addition, it guarantees a high quality of paste application.

Moreover, the present device is so designed that a number of such devices can be arranged one after another along the production line at a minimum pitch which is equal to, say, twice the diameter of the cylindrical electrodes, and, if necessary, any one of the devices can be replaced by a spare one.

Other objects and advantages of the present invention will become apparent from the examples described below and from the accompanying drawings, in which.

Figure 4:
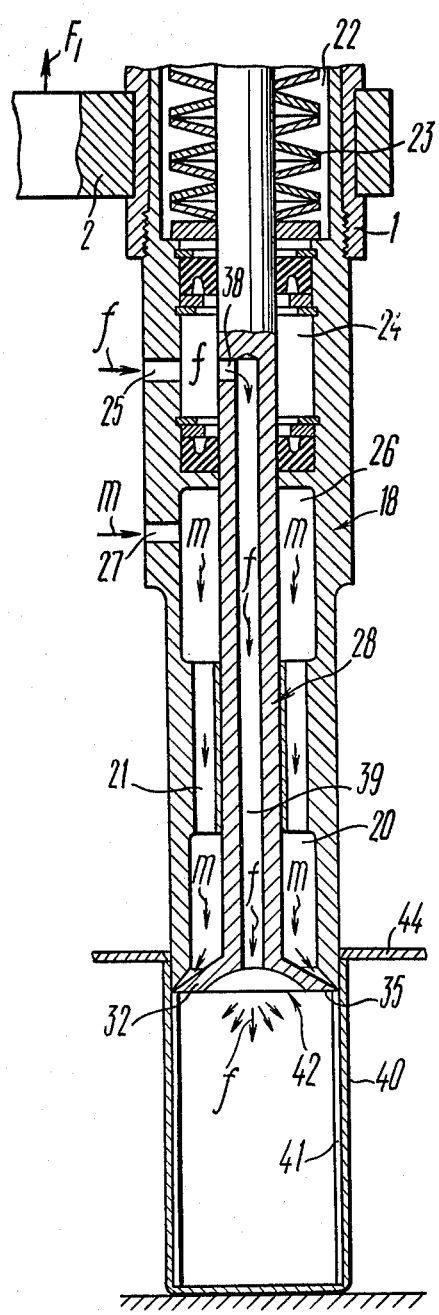
Figure 5:
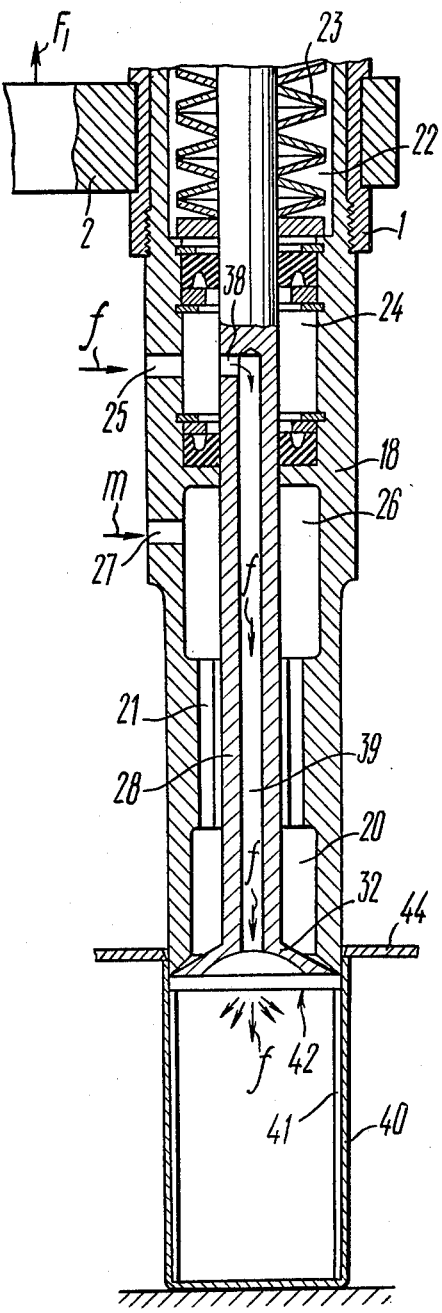

FIG. 4 is a longitudinal section showing the relative positions of the parts of the device at the moment of paste application to the internal surface of the cylindrical electrode of a primary cell, according to the invention; and FIG. 5 is a longitudinal section showing the relative positions of the parts of the device after application of a paste layer to the internal surface of the cylindrical electrode of a primary cell.

The device for application of paste to the internal surface of the cylindrical electrode of a primary cell comprises a cylindrical body 1 (FIG. 1) secured in a crosshead 2 which is kinematically linked by a rod 3 with a drive mechanism (not shown in the drawing), which reciprocates the cylindrical body 1 in the direction of the arrows F and $F_1$.

The cylindrical body 1 is divided by a partition 4 with a central hole 5 into an upper part 6 and a lower part 7.

The upper part 6 of the cylindrical body 1 accommodates a single-acting hydraulic cylinder 8. A first space 9 of the cylinder communicates through a pipe union 10 with a hydraulic system (not shown in the drawing).

The control mechanism of this system is linked kinematically with the drive mechanism of the cylindrical body 1 in order to ensure synchronous operation of the hydraulic cylinder 8 in combination with the reciprocating motion of the cylindrical body 1 by delivering the flow of oil in the direction of the arrow L at the moment of paste application and arrow $L_1$ at the moment when this process of paste application ceases.

Located in the lower part of the hydraulic cylinder 8 is a channel 11 which connects a second internal space 12 of the hydraulic cylinder 8 with the atmosphere to eliminate rarefaction and to collect probable oil leaks from the hydraulic cylinder 8.

The rod 13 of the hydraulic cylinder 8 carries a limiting nut 14 intended to ensure a preset clearance δ between the surface 15 of the partition 4 and the face surface 16 of the nut 14. The position of the limiting nut 14 is fixed by the lock nut 17.

A cylindrical arbor 18 secured rigidly in the lower part 7 of the cylindrical body 1 has a central channel 19 and a space 20 in the lower part intended to contain the paste delivered through channels 21.

The upper part of the cylindrical arbor 18 has another space 22 accommodating a spring 23.

The middle portion of the cylindrical arbor 18 accommodates a pressuretight space 24 communicating with a source of compressed air through a side hole 25, and a space 26 communicating with the pressure source of paste supply through a side hole 27 (the sources of compressed air and paste supply are not shown in the drawings).

Here arrows $f$ show the route of compressed air and arrows $m$ show the route of the paste.

The space 26 communicates with the internal space 20 through channels 21.

The central channel 19 of the cylindrical arbor 18 accommodates a mandrel 28 installed in said channel 19 with a provision for being reciprocated by the spring 23 and by the rod 13 of the hydraulic cylinder 8 which contacts the face surface 29 of the mandrel 28. The mandrel 28 together with the spring 23 constitutes the paste batching device.

Installed in the upper part of the mandrel 28 is an adjusting nut 30 and a lock nut 31 which press the spring 23 against the bottom of the cylindrical space 22 of the arbor 18, the diameter of these nuts being smaller than the inside diameter of the cylindrical space 22.

Figure 1:
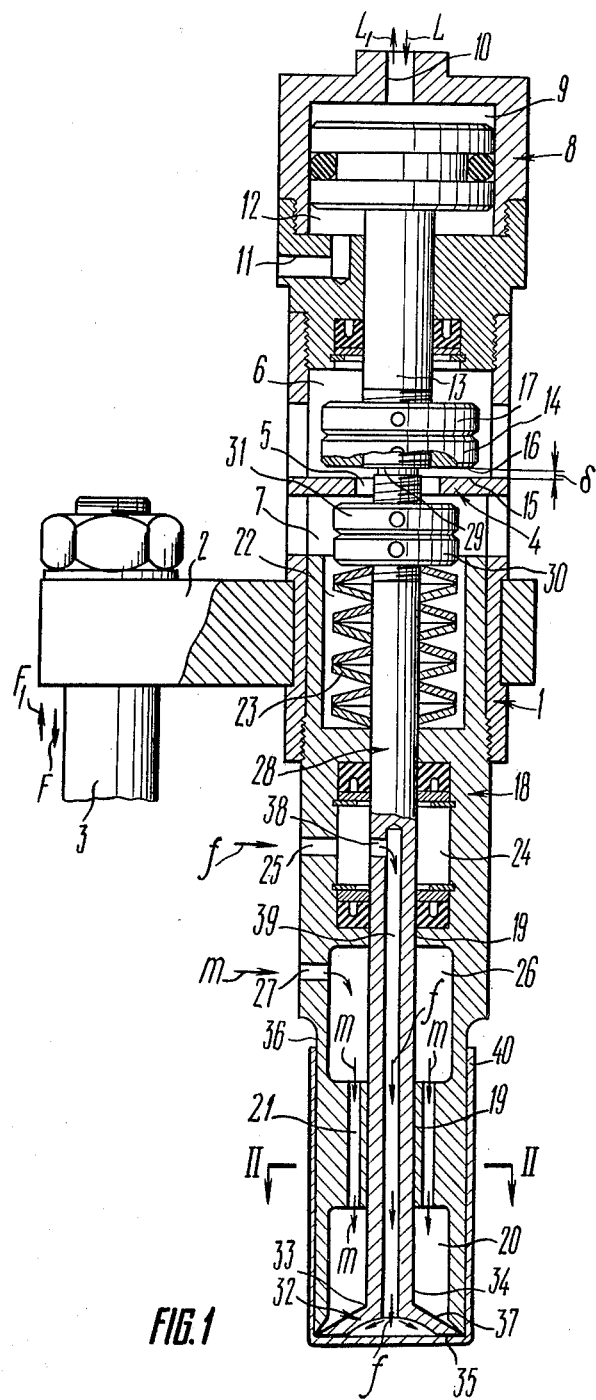
FIG. 1 is a longitudinal cross sectional view of the device, according to the invention, for application of paste to the internal surface of the cylindrical electrode of a primary cell.
Figure 2:
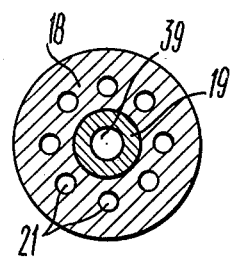
FIG. 2 is a cross sectional view of the device according to the invention taken along the line II — II in FIG. 1.

Shown in FIG. 2 is a cross sectional view along the line II — II of FIG. 1 illustrating eight channels 21 which conduct the paste from the space 26 (FIG. 1) into the space 20 of the arbor 18. The number of these channels 21 (FIG. 2) may vary.

Figure 3:
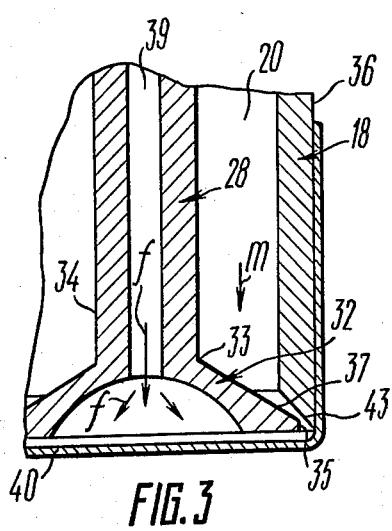
FIG. 3 is an enlarged longitudinal section of the lower part of the mandrel and arbor of the device according to the invention.

FIG. 3 is an enlarged cross sectional longitudinal view of the lower part 32 of the mandrel 28. The lower part 32 of the mandrel 28 has the shape of a truncated cone with the diameter of the smaller base 33 being equal to the diameter of the cylindrical part 34 of said mandrel 28.

The diameter of the larger base 35 of the truncated cone of the lower part 32 is smaller than the diameter of the external surface 36 of the arbor 18. The ratio of these diameters is selected from a range of 0.77 – 0.98, the generatrix 37 of the cone being inclined to the larger base 35 at an angle of from 10° to 60°.

Extending along the mandrel 28 from its lower part 32 to the side hole 38 (FIG. 1) located in the zone of the pressuretight space 24 is an internal channel 39 (FIG. 3) which supplies compressed air into the internal space of the cylindrical electrode 40 in the direction shown by arrows $f$ at the moment of application of the paste layer 41 (FIG. 4) to the internal surface of said electrode 40 to the mark 42 indicating the location of the air chamber of the primary cell.

The lower part 32 (FIG. 3) of the mandrel 28 has its larger base 35 in contact with the face surface 43 of the arbor 18, the angle of said surface 43 to the base 35 being larger than the inclination angle of the generatrix 37 but not less than 2° and not greater than 60°.

The device for application of paste to the internal surface of the cylindrical electrode of a primary cell functions as follows.

First, the drive mechanism moves the body 1 by means of the rod 3 (FIG. 1) and crosshead 2 along arrow $F_1$ to the extreme upper position. The electrode 40 is moved under the arbor 18 by a conventional conveyor and is fixed from moving from the working positions by means of stops 44 (FIG. 4).

Then the paste is delivered through the hole 27 (FIG. 1) along arrow $m$ from the pressure source of paste supply; during this process there is no oil pressure in the internal space 9 of the hydraulic cylinder 8 and the surplus oil is discharged through the pipe union 10 along arrow $L_1$.

The mandrel 28 is lifted by the spring 23 to the uppermost position and its face surface 29 comes in contact with the rod 13. The adjusting nut is set so that there appears a clearance δ between the face surface 16 and the surface 15 of the partition 4, said clearance corresponding to the required thickness of the applied layer of paste.

The larger base 35 of the cone on the lower part 32 of the mandrel 28 is pressed against the face part 43 (FIG. 3) of the arbor 18 with a force sufficient for reliably shutting off of the flow of paste delivered under pressure from the space 26 (FIG. 1) through the channels 21 into the space 20. The shutting-off force is set by compressing the spring 23 with the nut 30, the latter being secured by the lock nut 31. After setting the electrode 40 coaxially with the arbor 18 the body 1 together with the arbor 18 is moved down along arrow F to the bottom of the electrode 40 (FIG. 4).

Then oil is delivered under pressure from the hydraulic system through the pipe union 10 along arrow L into the space 9 (FIG. 1) of the hydraulic cylinder 8. As a result, the rod 13 moves a distance which is equal to the clearance δ between the surface 15 of the partition 4 and the face surface 16 of the nut 14. This forms a concentric gap between the face part 43 (FIG. 3) of the arbor 18 and the lower conical part 32 of the mandrel 28; the paste under pressure flows through said gap along arrow $m$ (FIG. 4) onto the internal surface of the cylindrical electrode 40.

As the arbor 18 moves back from the bottom of the electrode 40 along arrow $F_1$, a layer of paste 41 is formed on the internal surface of the cylindrical electrode 40.

When the arbor 18 is moving along arrow $F_1$, compressed air is delivered through the side hole 25 along arrow $f$ into the internal space of the electrode 40 and ensures adhesion of the paste layer 41 to the internal surface of the electrode 40. As the lower part 35 reaches the mark 42, the oil pressure is relieved in the space 9 (FIG. 1) of the hydraulic cylinder 8 and the mandrel 28 is moved by the spring 23 to the uppermost position, wherein its lower part 32 shuts off the flow of paste from the space 20.

Such a relative arrangement of the mandrel 28, arbor 18 and cylindrical electrode 40 is shown in FIG. 5 wherein the stops 44 hold the electrode 40 against vertical movement after the arbor 18.

The supply of compressed air ceases as soon as the arbor 18 leaves the cylindrical electrode 40 after which the electrode 40 with the layer 41 of paste on its internal surface applied to the mark 42 is transferred by a conveying device to the next assembly: operation of the primary cell.

The time sequence of operations related to the movement of the arbor 18 (FIG. 5) and mandrel 28 can be ensured with the aid of a conventional synchronizing mechanism habitually used in flow lines under the conditions of mass production of primary cells.

The device for application of paste to the internal surface of the cylindrical electrode of a primary cell according to the present invention can be used to advantage in flow line production since its design makes it possible to install quite a number of such devices along the flow line.

In addition, the device guarantees a high quality of the applied paste layer 41, i.e., its requisite thickness, uniformity, and height, which reaches only to the mark 42 which indicates the border of the air chamber of the primary cell being formed, as well as a sound contact between the layer 41 and the internal surface of the cylindrical electrode 40.

What is claimed is:

1. A device for application of paste to an internal surface of a cylindrical electrode of a primary cell comprising:
   - a cylindrical body with means for reciprocating motion;
   - a partition dividing said body into upper and lower parts and being provided with a hole;
   - a hydraulic cylinder installed in said upper part of said body and having a rod;
   - a limiting nut installed at the end of said rod and having a diameter which is larger than the diameter of said hole in said partition;
   - a cylindrical arbor having an external surface secured by an upper part in said lower part of said body and having a central channel accommodating consecutively arranged first, second, third and fourth spaces,
   - said first space of said arbor being located in said lower part of said arbor for holding a supply of paste,
   - said second apace of said arbor being located in the upper part of said arbor,
   - said third space of said arbor being located in the middle part of said arbor,
   - said fourth space of said arbor being located in the middle part of said arbor between said third and said first speaces of said arbor;
   - a mandrel installed in said central channel of said arbor with means for reciprocating motion and having an upper cylindrical part and a lower part in the form of a truncated cone whose larger base serves as the face of said mandrel,
   - said mandrel including a channel for compressed air,
   - a side hole in said mandrel located in the zone of said third space of said arbor and placing said channel of said mandrel in communication with said third space of said arbor;
   - an adjusting nut installed at the end of said upper part of said mandrel below said partition and having a diameter which is smaller than the diameter of said second space of said arbor;
   - a spring installed on said mandrel and located in said second space of said arbor;
   - said lower part of said mandrel being made in the form of a truncated cone having its generatrix inclined to said larger base at an angle varying from 10° to 60°, the ratio of the diameter of said larger base to the diameter of said external surface of said arbor ranging from 0.77 to 0.98;
   - a first side hold of said arbor made in the zone of the third space of said arbor and being used to supply compressed air into said third space of said arbor;
   - a second side hole of said arbor located in the zone of said fourth space of said arbor and being used to supply paste under pressure into said fourth space of said arbor; and
   - at least one channel for paste made inside of said arbor for placing said first and said fourth spaces of said arbor in communication with each other.

* * * * *